(12) United States Patent
Moyal et al.

(10) Patent No.: US 9,128,571 B2
(45) Date of Patent: Sep. 8, 2015

(54) CAPACITIVE TOUCH PANEL HAVING IMPROVED RESPONSE CHARACTERISTICS

(75) Inventors: Nathan Y. Moyal, Mukilteo, WA (US); Tao Peng, Nashua, NH (US); Jerry L. Doorenbos, Tucson, AZ (US); Ronald F. Cormier, Vail, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 467 days.

(21) Appl. No.: 13/555,556

(22) Filed: Jul. 23, 2012

(65) Prior Publication Data

US 2014/0022200 A1 Jan. 23, 2014

(51) Int. Cl.
*G06F 3/044* (2006.01)

(52) U.S. Cl.
CPC ...... *G06F 3/044* (2013.01); *G06F 2203/04103* (2013.01); *G06F 2203/04111* (2013.01)

(58) Field of Classification Search
CPC .......... G06F 3/044; G06F 2203/04013; G06F 2203/04111; G06F 2203/04112; G06F 2203/04017
USPC .................................. 345/173–174
See application file for complete search history.

(56) References Cited

U.S. PATENT DOCUMENTS

| 7,202,859 | B1 * | 4/2007 | Speck et al. ................... 345/174 |
| 2007/0074914 | A1 * | 4/2007 | Geaghan et al. ........... 178/18.06 |
| 2010/0295813 | A1 * | 11/2010 | Kent .............................. 345/174 |
| 2011/0095996 | A1 * | 4/2011 | Yilmaz ......................... 345/173 |
| 2011/0095997 | A1 | 4/2011 | Philipp |
| 2011/0102361 | A1 | 5/2011 | Philipp |
| 2011/0157079 | A1 | 6/2011 | Wu et al. |

\* cited by examiner

*Primary Examiner* — Kathy Wang-Hurst
*Assistant Examiner* — David Tung
(74) *Attorney, Agent, or Firm* — Tuenlap D. Chan; Frank D. Cimino

(57) ABSTRACT

An apparatus is provided. The apparatus comprises a second layer disposed over a first layer. Each of the first and second layers have a set of detection electrodes that are spaced apart and electrically isolated from one another and an associated set of interleavers. Each interleaver is located between adjacent detection electrodes from its associated the set of detection electrodes, and each set of interleavers also includes a pair of complementary interleaving electrodes coupled to those that are electrically coupled to the adjacent detection electrodes from its associated set of detection electrodes. The detection electrodes and interleaving electrodes are also substantially transparent to visible spectrum light.

26 Claims, 13 Drawing Sheets

CAPACITIVE TOUCH PANEL HAVING IMPROVED RESPONSE CHARACTERISTICS

TECHNICAL FIELD

The invention relates generally to a touch panel and, more particularly, to a capacitive touch panel having an improved response.

BACKGROUND

Turning to FIGS. 1 and 2, an example of a conventional system 100 can be seen. System 100 generally comprises a touch panel 102 and touch panel controller 104. The touch panel 102 has an array of sensors formed by a set of column electrodes (e.g., electrode 103), where each electrode of each column is coupled together by a strip electrode (e.g., strip electrode 107), and a set of row electrodes (e.g., electrode 109), where each electrode of each row is coupled together by a strip electrode (e.g., strip electrode 107). Usually, the column and row electrodes (e.g., electrodes 103 and 105) are formed in two separate layers with a dielectric or insulating layer formed therebetween, and these conductive layers which form the electrodes (e.g., electrodes 105 and 109) are generally transparent to visible spectrum light (e.g., light having a wavelength from about 380 nm to about 750 nm). The strip electrodes for each column (e.g., strip electrode 107) are then coupled to the interface or I/F 106 of the touch panel controller 104 by terminals X-1 to X-N, while the strip electrodes for each row (e.g., strip electrode 109) are coupled to the interface 106 by terminals Y-1 to Y-M. The interface 106 is able to communicate with the control circuit 108. As shown in greater detail in FIG. 2, the interface 106 is generally comprised of a multiplexer or mux 202 and an exciter 204.

In operation, the interface 106 (which is usually controlled by the control circuit 108) selects and excites columns of electrodes (e.g., electrode 103) and "scans through" the rows of row electrodes (e.g., electrode 105) so that a touch position from a touch event can be resolved. As an example, interface 204 can excite two adjacent columns through terminals X-j and X-(j+1) with excitation signals EXCITE[j] and EXCITE[j+1], and interface 106 receives a measurement signal from a row associated with terminal Y-i. When an object (e.g., finger) is in proximity to the touch panel (which is generally considered to be a touch event), there is a change in capacitance due at least in part to the arrangement of electrodes (e.g., electrodes 103 and 105), and the controller 108 is able to resolve the position of the touch event.

Most conventional touch panels (e.g., touch panel 102) do, however, exhibit a non-uniform response characteristic, which is manifested as non-uniform signal strength across the panel. This non-uniformity is generally caused by natural variations in the patterns forming the column and row electrodes (e.g., electrodes 103 and 105). In other words, the electrodes are arranged to have gaps or non-overlapping regions between the electrodes so that, as an object (e.g., finger) traverses the panel (e.g., panel 102) and passes over these non-overlapping regions, the signal strength or measured capacitance changes. Therefore, there is a need for a touch panel having a more uniform response characteristic.

Some examples of other conventional systems are: U.S. Patent Pre-Grant Publ. No. 2011/0095996; U.S. Patent Pre-Grant Publ. No. 2011/0095997; U.S. Patent Pre-Grant Publ. No. 2011/0102361; and U.S. Patent Pre-Grant Publ. No. 2011/0157079.

SUMMARY

An embodiment of the present invention, accordingly, provides an apparatus. The apparatus comprises a first layer having: a first set of detection electrodes that are spaced apart and electrically isolated from one another, wherein each detection electrode from the first set of detection electrodes is substantially transparent to visible spectrum light; and a first set of interleavers, wherein each interleaver from the first set of interleavers is located between adjacent detection electrodes from the first set of detection electrodes, and wherein each interleaver from the first set of interleavers includes: a first set of interleaving electrodes that are electrically coupled to one of its adjacent detection electrodes from the first set of detection electrodes, wherein each interleaving electrode from the first set of interleaving electrodes is substantially transparent to visible spectrum light; and a second set of interleaving electrodes that are electrically coupled to the other of its adjacent detection electrodes from the first set of detection electrodes, wherein each interleaving electrode from the second set of interleaving electrodes is substantially transparent to visible spectrum light; and a second layer that is disposed over the first layer, wherein the second layer has: a second set of detection electrodes that are spaced apart and electrically isolated from one another, wherein each detection electrode from the second set of detection electrodes is substantially transparent to visible spectrum light; and a second set of interleavers, wherein each interleaver from the second set of interleavers is located between adjacent detection electrodes from the second set of detection electrodes, and wherein each interleaver from the second set of interleavers includes: a third set of interleaving electrodes that are electrically coupled to one of its adjacent detection electrodes from the second set of detection electrodes, wherein each interleaving electrode from the third set of interleaving electrodes is substantially transparent to visible spectrum light; and a fourth set of interleaving electrodes that are electrically coupled to the other of its adjacent detection electrodes from the second set of detection electrodes, wherein each interleaving electrode from the fourth set of interleaving electrodes is substantially transparent to visible spectrum light.

In accordance with an embodiment of the present invention, the first layer further comprises: a substrate that is substantially transparent to visible spectrum light; a conductive layer disposed over the substrate, wherein the conductive layer is patterned to form the first sets of detection electrodes and interleavers; and an insulating layer disposed over the conductive layer.

In accordance with an embodiment of the present invention, the conductive layer further comprises a first conductive layer, and wherein the insulating layer further comprises a first insulating layer, and wherein the second layer further comprises: a second conductive layer disposed over the first layer, wherein the second conductive layer is patterned to form the second sets of detection electrodes and interleavers; and a second insulating layer disposed over the conductive layer.

In accordance with an embodiment of the present invention, the first set of detection electrodes further comprises a first set of strip electrodes that are substantially parallel with one another and are oriented in a first direction, and wherein the second set of detection electrodes further comprises a second set of strip electrodes that are substantially parallel to one another and oriented in a second direction, and wherein the orientation of the first and second sets of strip electrodes with respect to one another forms a plurality of non-overlapping zones.

In accordance with an embodiment of the present invention, the first direction is substantially perpendicular to the second direction.

In accordance with an embodiment of the present invention, complementary pairs of interleaving electrodes from at least one of the first and second sets of interleaving electrodes and the third and fourth sets of interleaving electrodes are located in each non-overlapping zone.

In accordance with an embodiment of the present invention, each interleaving electrode is substantially rectangular in shape.

In accordance with an embodiment of the present invention, each interleaving electrode is substantially triangular in shape.

In accordance with an embodiment of the present invention, the first and second sets of strip electrodes further comprise first and second sets of linear strip electrodes.

In accordance with an embodiment of the present invention, the first and second sets of strip electrodes further comprise first and second sets of diamond strip electrodes.

In accordance with an embodiment of the present invention, the complementary pairs of interleaving electrodes from the first and second sets of interleaving electrodes and from the third and fourth sets of interleaving electrodes are located in each non-overlapping zone.

In accordance with an embodiment of the present invention, an apparatus is provided. The apparatus comprises a touch panel screen having a touch sensor disposed over a display, wherein the touch sensor has: a first layer having: a first set of detection electrodes that are spaced apart and electrically isolated from one another, wherein each detection electrode from the first set of detection electrodes is substantially transparent to visible spectrum light; and a first set of interleavers, wherein each interleaver from the first set of interleavers is located between adjacent detection electrodes from the first set of detection electrodes, and wherein each interleaver from the first set of interleavers includes: a first set of interleaving electrodes that are electrically coupled to one of its adjacent detection electrodes from the first set of detection electrodes, wherein each interleaving electrode from the first set of interleaving electrodes is substantially transparent to visible spectrum light; and a second set of interleaving electrodes that are electrically coupled to the other of its adjacent detection electrodes from the first set of detection electrodes, wherein each interleaving electrode from the second set of interleaving electrodes is substantially transparent to visible spectrum light; and a second layer that is disposed over the first layer, wherein the second layer has: a second set of detection electrodes that are spaced apart and electrically isolated from one another, wherein each detection electrode from the second set of detection electrodes is substantially transparent to visible spectrum light; and a second set of interleavers, wherein each interleaver from the second set of interleavers is located between adjacent detection electrodes from the second set of detection electrodes, and wherein each interleaver from the second set of interleavers includes: a third set of interleaving electrodes that are electrically coupled to one of its adjacent detection electrodes from the second set of detection electrodes, wherein each interleaving electrode from the third set of interleaving electrodes is substantially transparent to visible spectrum light; and a fourth set of interleaving electrodes that are electrically coupled to the other of its adjacent detection electrodes from the second set of detection electrodes, wherein each interleaving electrode from the fourth set of interleaving electrodes is substantially transparent to visible spectrum light; and a touch panel controller that is electrically coupled to the first and second sets of detection electrodes.

In accordance with the present invention, the first set of interleaving electrodes form a first set of first serpentines with its detection electrodes, and wherein the second set of interleaving electrodes form a second set of serpentines with its detection electrodes, and wherein each first serpentine is interleaved with at least one second serpentine.

In accordance with the present invention, the third and forth interleaving electrodes form a zig-zag pattern the overlaps the interleaved first and second serpentines.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
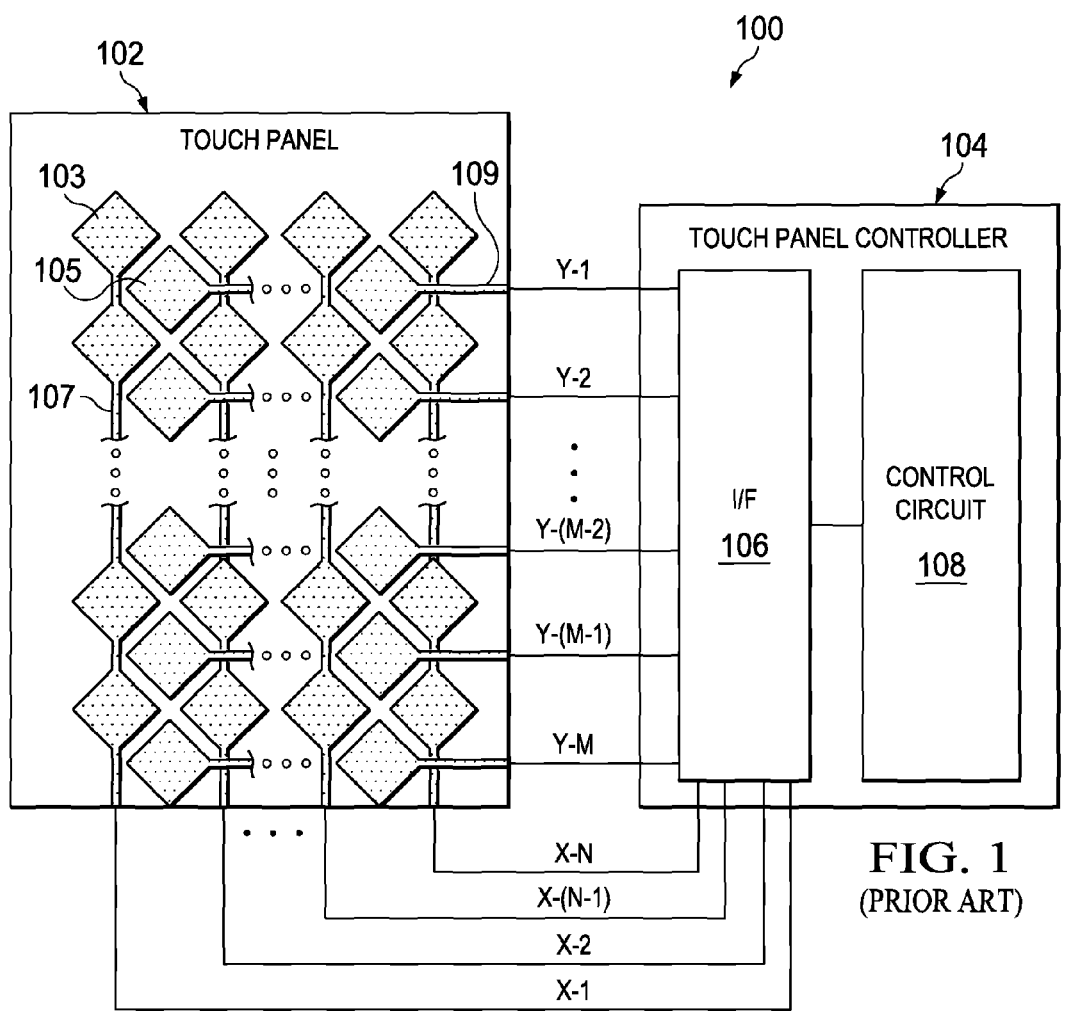
FIGS. 1 and 2 are diagrams of an example of a conventional system.
Figure 2:
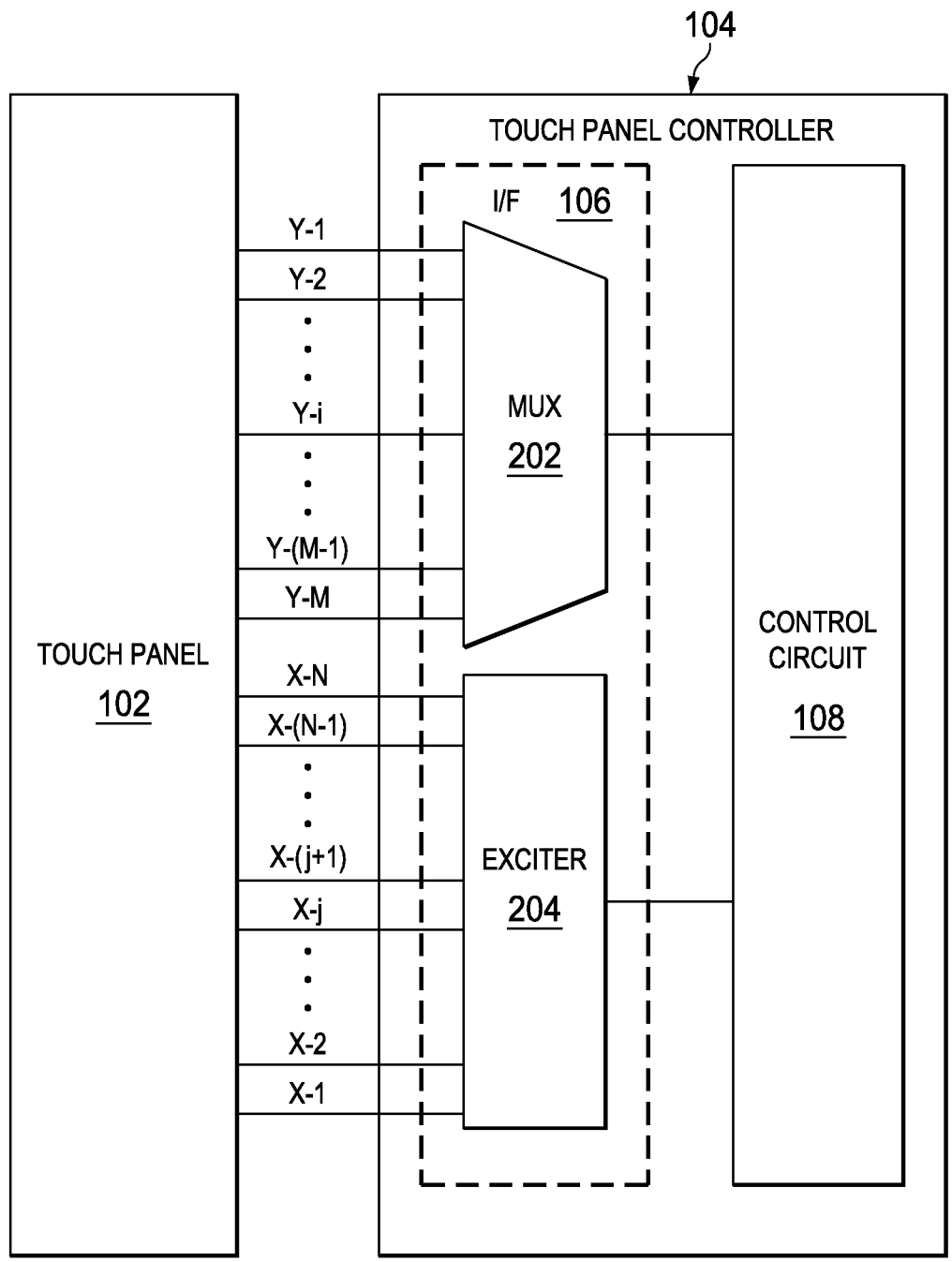

Refer now to the drawings wherein depicted elements are, for the sake of clarity, not necessarily shown to scale and wherein like or similar elements are designated by the same reference numeral through the several views.

Figure 3:
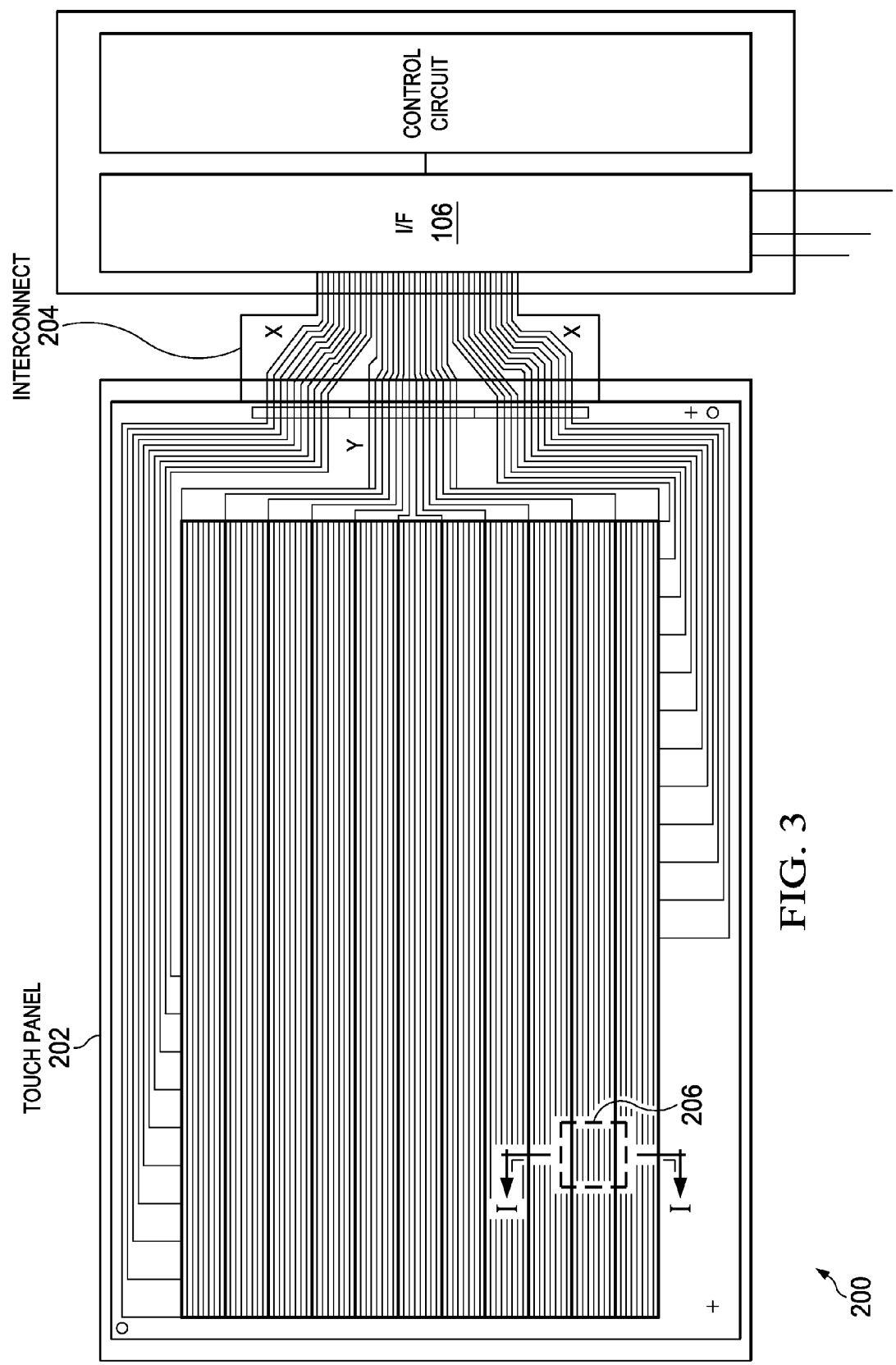
FIG. 3 is a diagram of an example of a system in accordance with the present invention.

Turning to FIG. 3, an example of a system 200 in accordance with an embodiment of the present invention can be seen. System 200 is similar in construction to system 100 except that touch panel 102 has been replaced by touch panel 202. Additionally, interconnect 204 has been provided to provide communication channels between the touch panel controller 104 and the touch panel 202.

Figure 4:
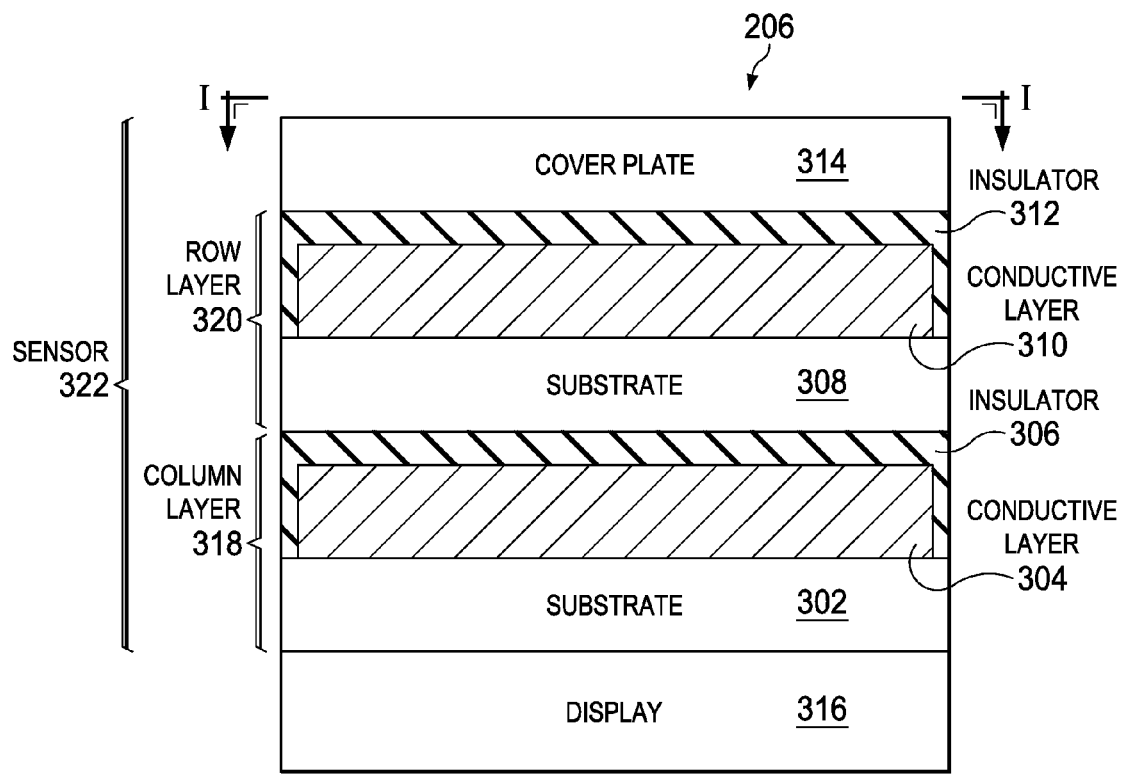
FIG. 4 is a cross-sectional view of a touch panel of FIG. 3 along section line I-I.

In FIG. 4, a cross sectional view for section 206 of touch panel can be seen. As shown in this example, the touch panel 202 is generally comprised of a touch sensor 322 disposed over or positioned over a display 316 (which can, for example be a liquid crystal display or LCD) so as to allow the light from the display to project through the sensor 322. This means that each layer of the sensor 322 is substantially transparent to visible spectrum light. As shown, the touch sensor 322 is a dual or two layer sensor, having a row layer 320, column layer 318, and cover plate 314. The column and row layers 318 and 320, in this example, each have a conductive layer 304 and 310 (respectively) disposed on a substrate 302 and 308 (respectively), but one of the substrates 302 or 308 may be used instead of two. Typically, the substrates 302 and 308 are formed of glass (which is substantially transparent to visible spectrum light), and the conductive layers 310 and 304 are usually formed of a conductive material that is generally transparent to visible spectrum light (such as indium tin oxide, aluminum doped zinc oxide, gallium doped zinc oxide, or indium doped zinc oxide). Conductive layers 304 and 310 are also usually formed by electron beam evaporation, physical vapor deposition (PVD), or sputter deposition on the substrates 302 and 308, which can, for example, then be patterned using laser ablation or etching so to form the detection electrodes. The row and column layers 320 and 318 can then be secured to one another and the cover plate 314, using an insulating or dielectric material (which can be an adhesive, like epoxy).

Figure 5:
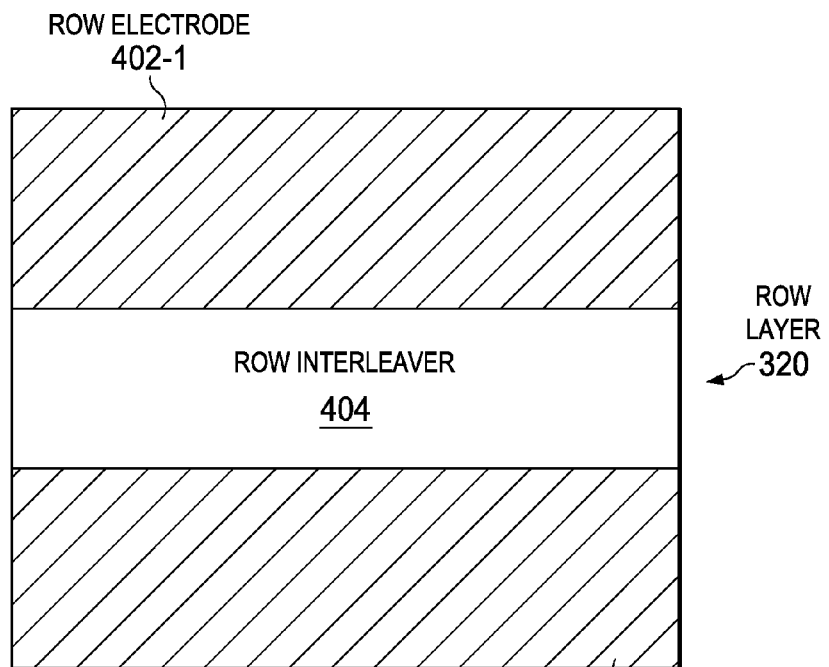
FIGS. 5 and 6 are plan views of portions of the section of the touch panel depicted in FIG. 4.
Figure 6:
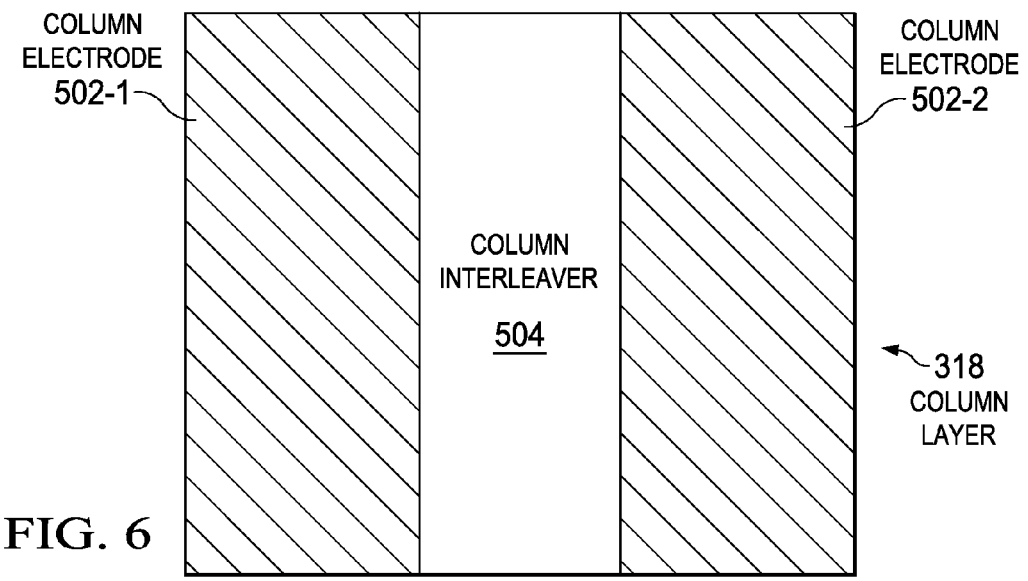

In order to achieve a more uniform response characteristic for the touch sensor 322, the patterns for the conductors 304 and 310 should be modified. As shown in the example of FIGS. 5 and 6, row and column interleavers 404 and 504 (respectively) are introduced between adjacent rows (e.g., rows 402-1 and 402-2) and adjacent columns (e.g., columns 502-1 and 502-2) across the touch sensor 322. The interleavers (e.g., 404 and 504) can vary in configuration based on the shape or configuration of the conductors 304 and 310 but are intended to reduce the size (and, thus, the impact) of the non-overlapping zones and produce a generally uniform response characteristic across the touch sensor 322.

Figure 7:
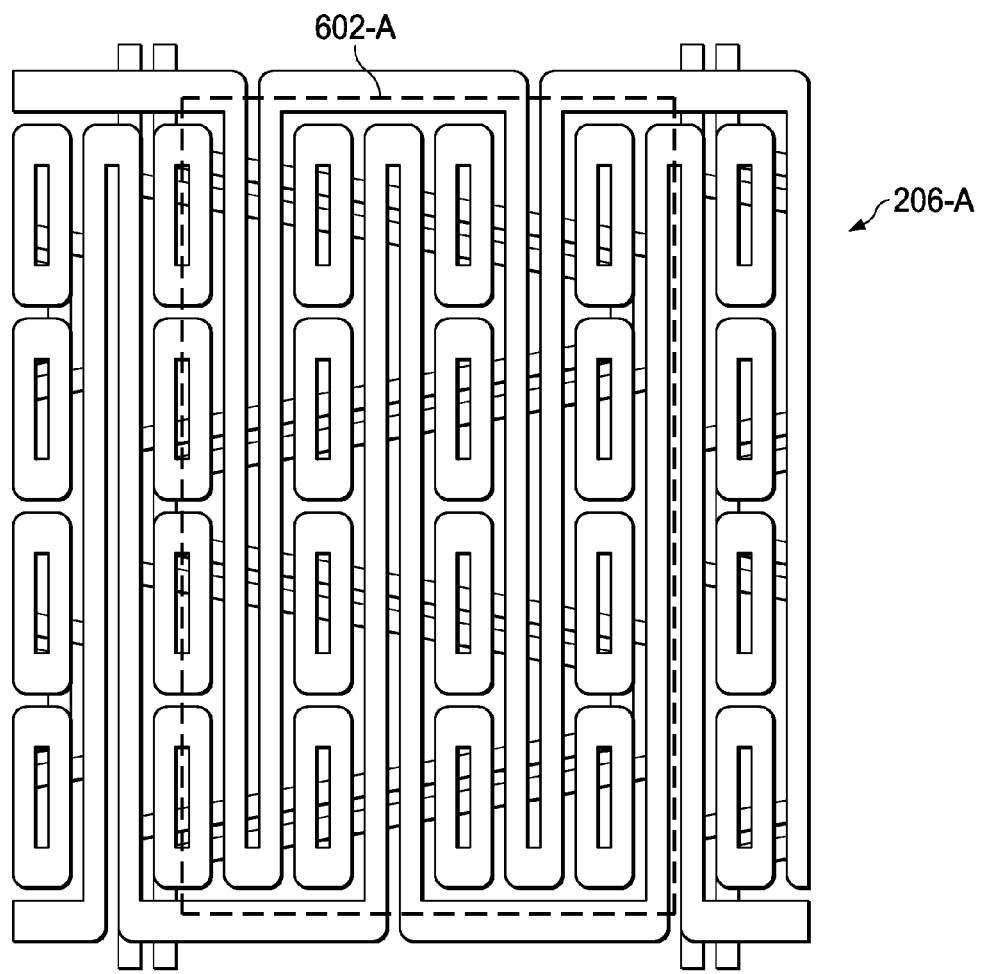
FIGS. 7-20 are examples of the plan views shown in FIGS. 5 and 6.
Figure 8:
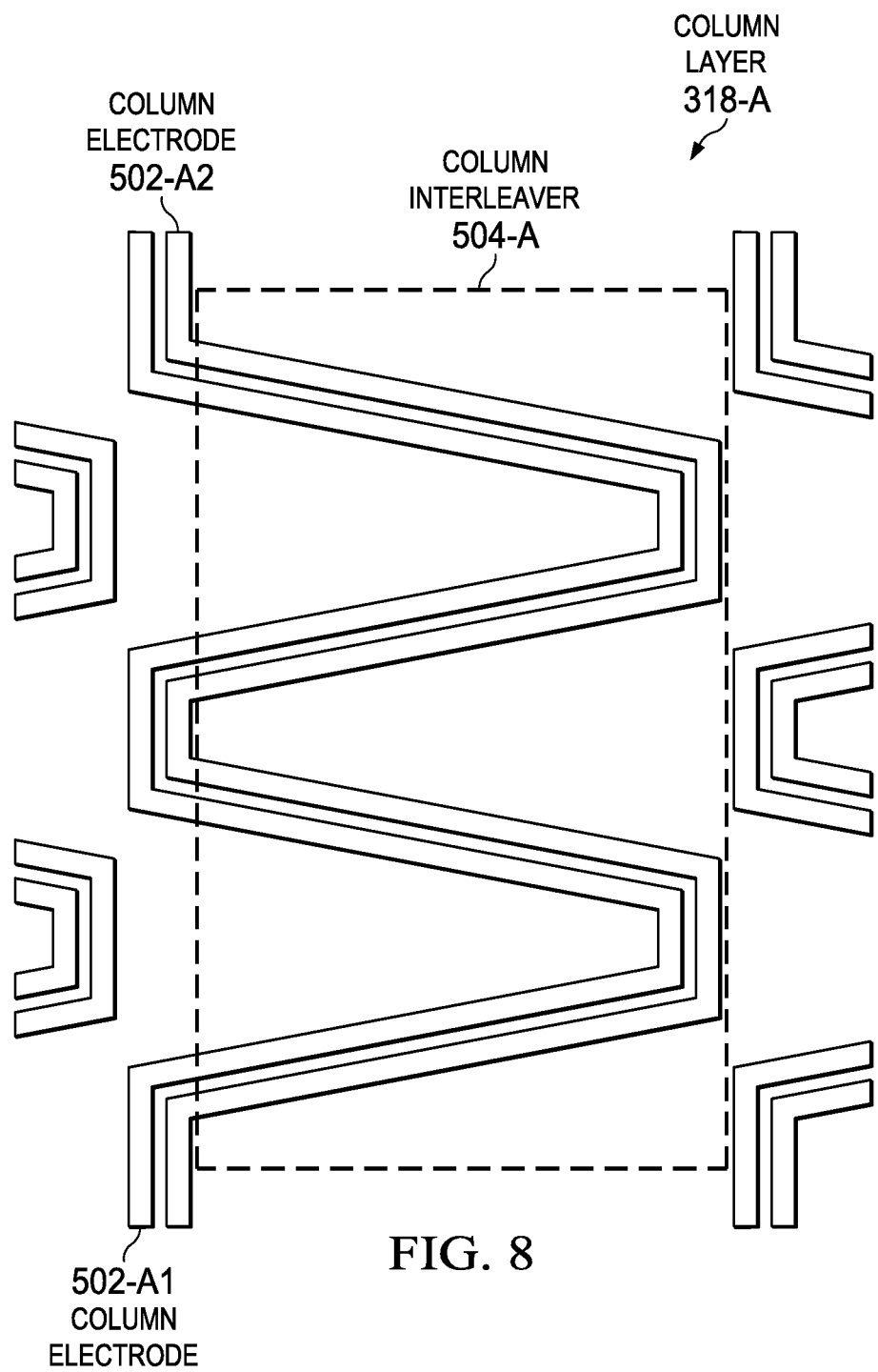
Figure 9:
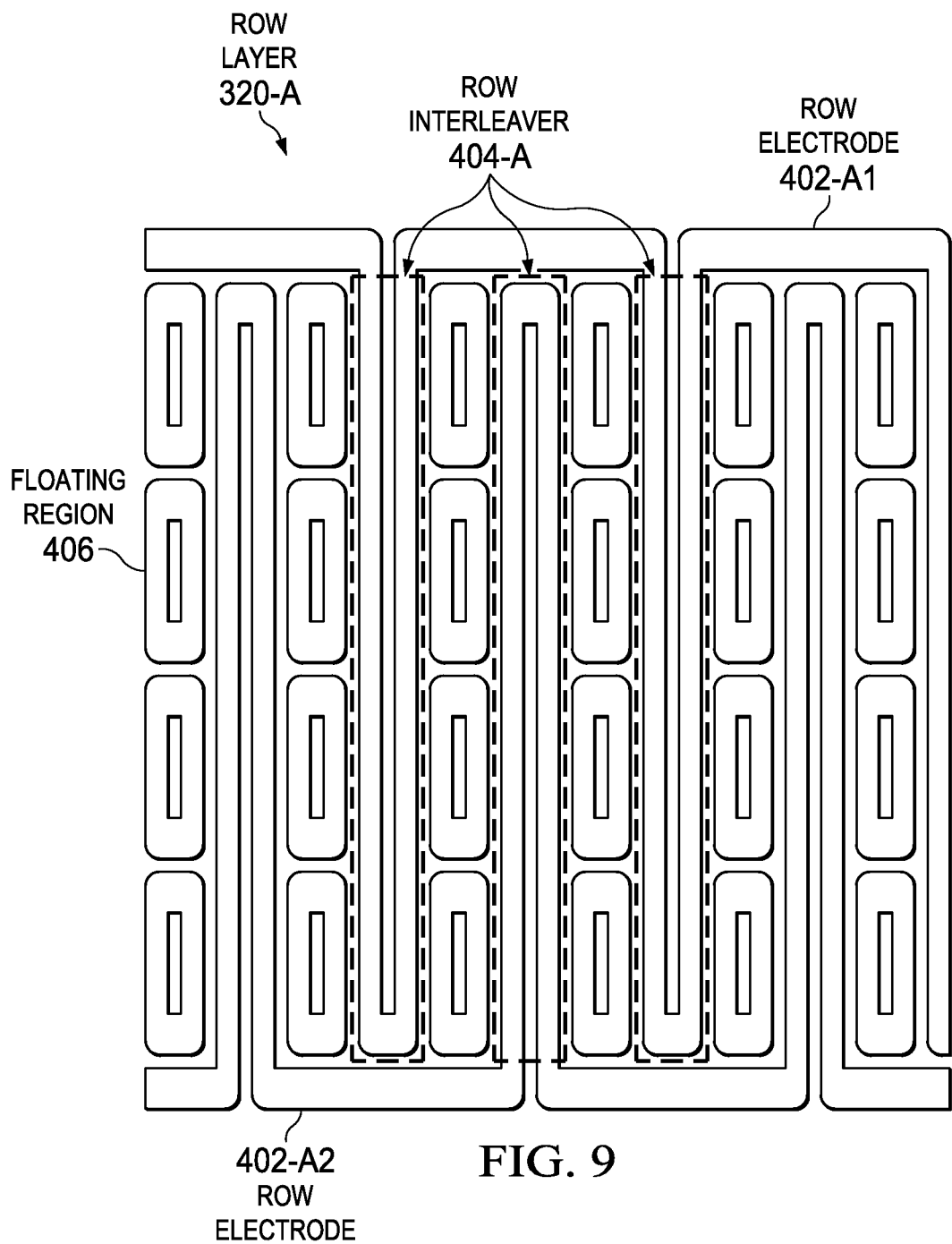

In FIGS. 7-9, an example of an arrangement for the row and column interleavers 404 and 504 is shown (which are labeled 404-A and 504-A, respectively) for section 206-A. In this example, row electrodes 402-A1 and 402-A2 are combined with row interleaver 404-A so as to form serpentine electrodes that are interleaved with one another. The row layer 320-A can also (optionally) include floating regions (e.g., floating region 406) interspersed between sections of the row interleaver 404-A, which can improve optical characteristics and response of the sensor (e.g., 322). Overlapping the row electrodes 402-A1 and 402-A2 and row interleaver 404-A are the column electrodes 502-A1 and 502-A2 and column interleaver 504-A that are arranged in a zig-zag or "fishbone" pattern.

Figure 10:
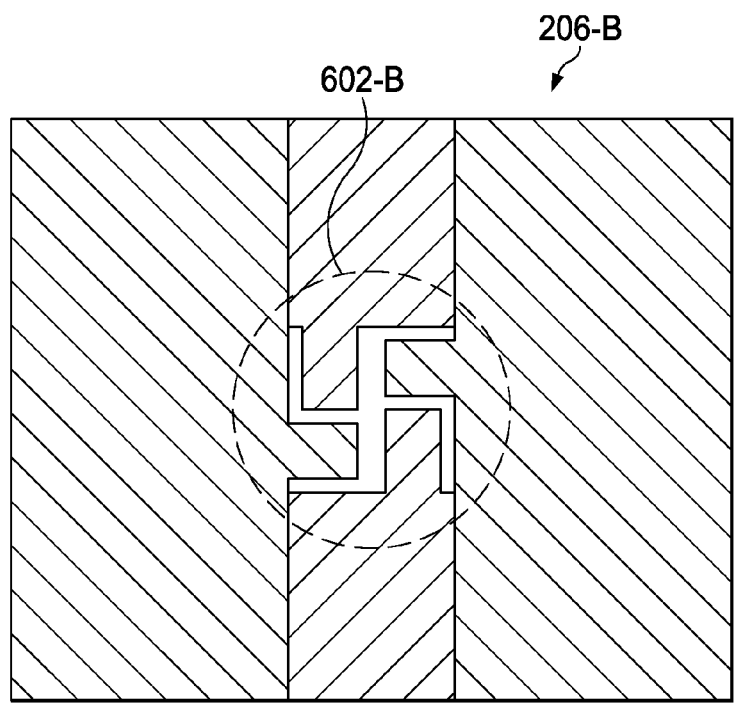
Figure 11:
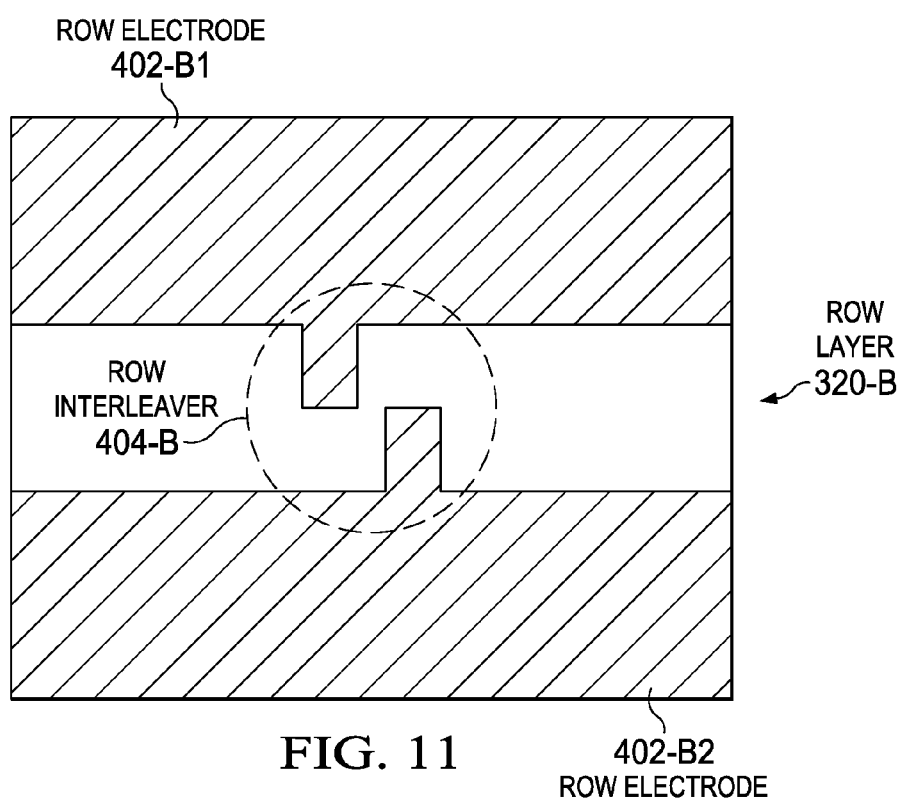
Figure 12:
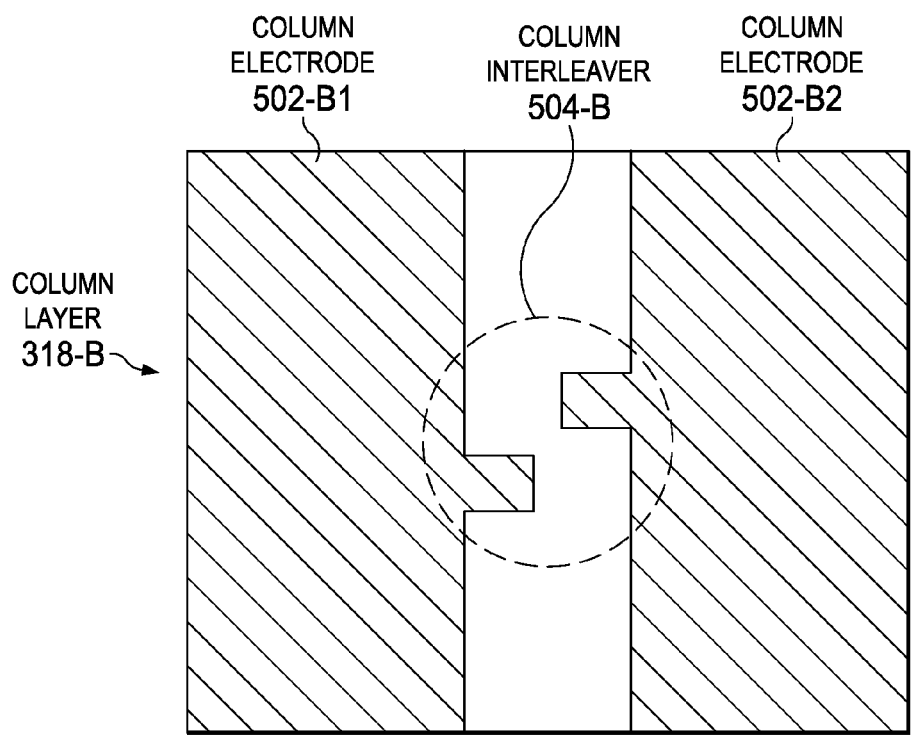
Figure 13:
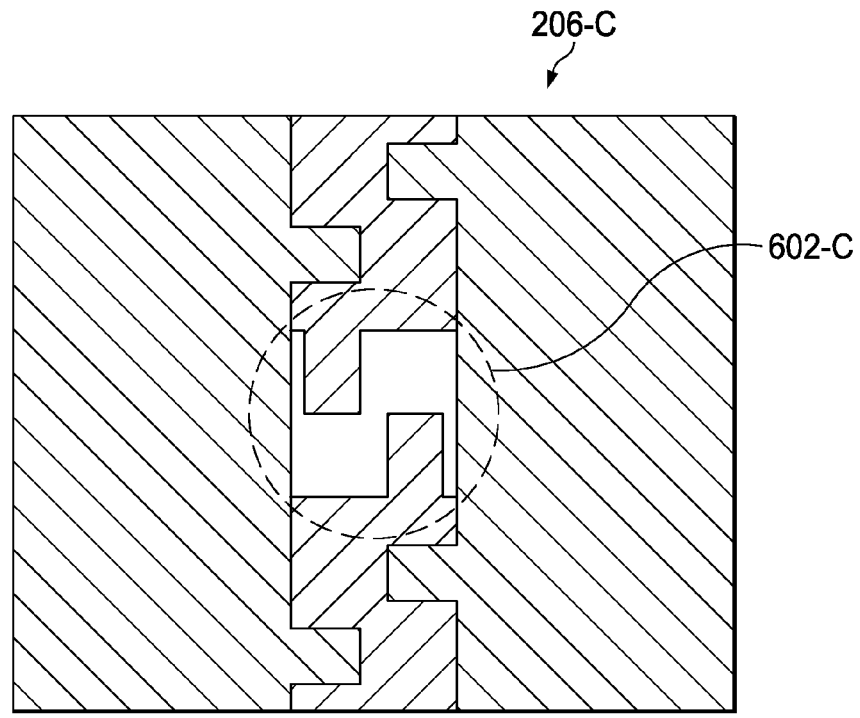
Figure 14:
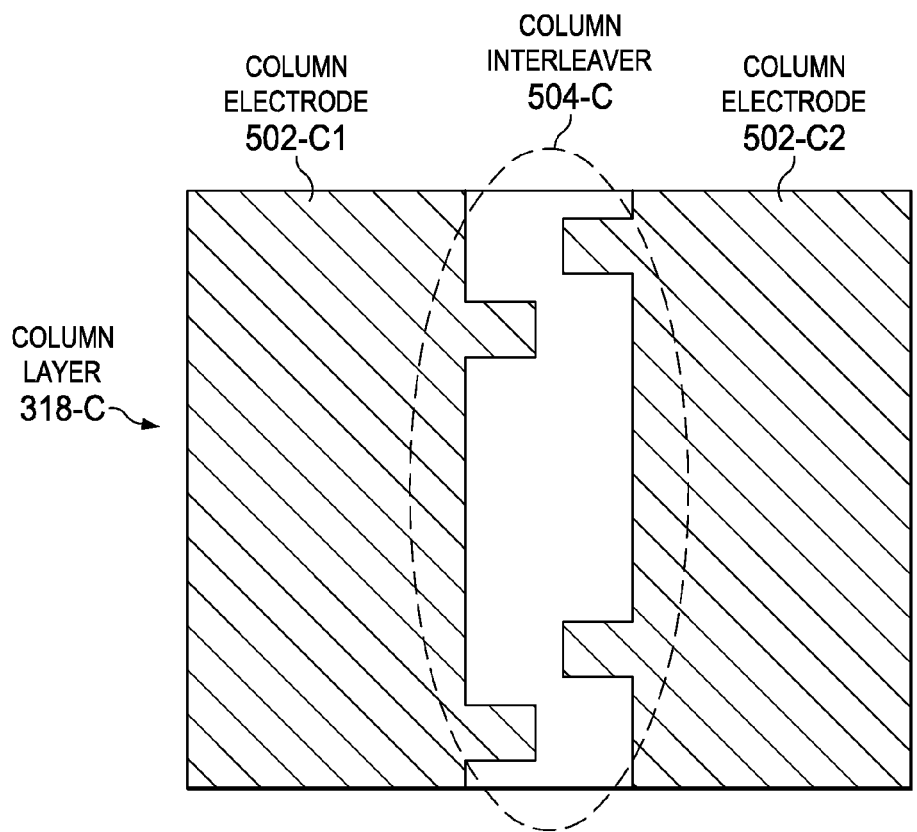

Turning to FIGS. 10-12, another example of an arrangement for the row and column interleavers 404 and 504 (which are labeled 404-B and 504-B, respectively) for section 206 (which is labeled 206-B) can be seen. For this example, column electrodes 502-B1 and 502-B2 and row electrodes 402-B1 and 402-B2 are linear strip conductors that are oriented in different directions so as to be perpendicular to one another. Because linear strip electrodes are employed, the non-overlapping region 602-B is large. So, the row and column interleavers 404-A and 502-A are each formed of complementary pairs of interleaving electrodes that are each electrically coupled to a corresponding electrode (e.g., 402-A1) and that extend into the non-overlapping region 602-B. These complementary pairs of interleaving electrodes, however, remain electrically isolated from one another. By doing this, the effect that the non-overlapping region has on the performance of the touch sensor 322 can be greatly reduced. Alternatively, as shown in FIGS. 13 and 14, all of the complementary pairs of interleaving electrodes do not need to be within the non-overlapping region (as shown with region 602-C), but some (e.g., interleaving electrodes for column interleaver 504-C in column layer 318-C) may be in proximity or substantially over/under corresponding electrodes (e.g., row electrode 402-1) in a staggered pattern.

Figure 15:
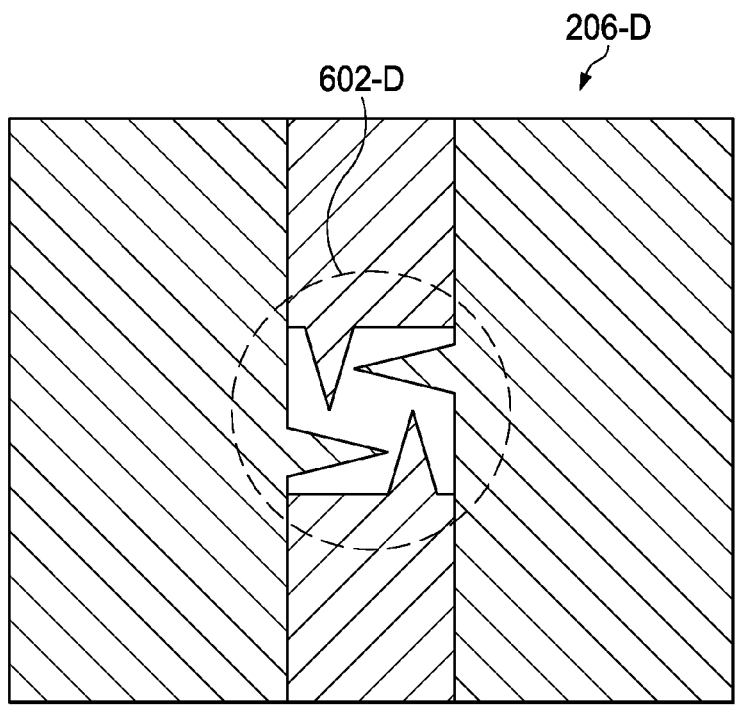
Figure 16:
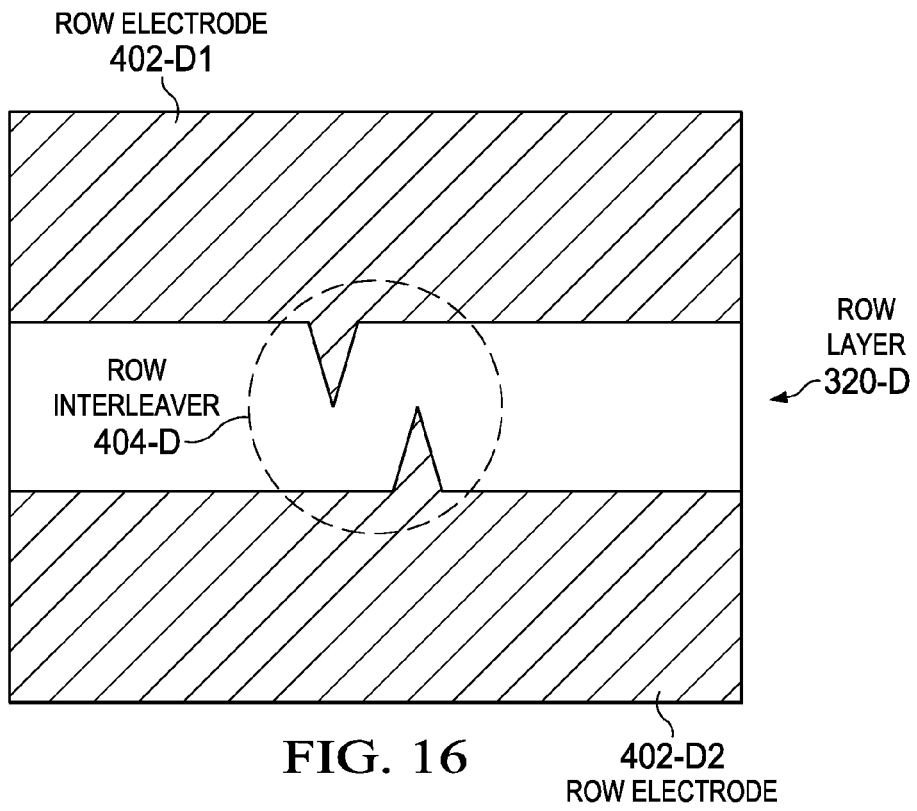
Figure 17:
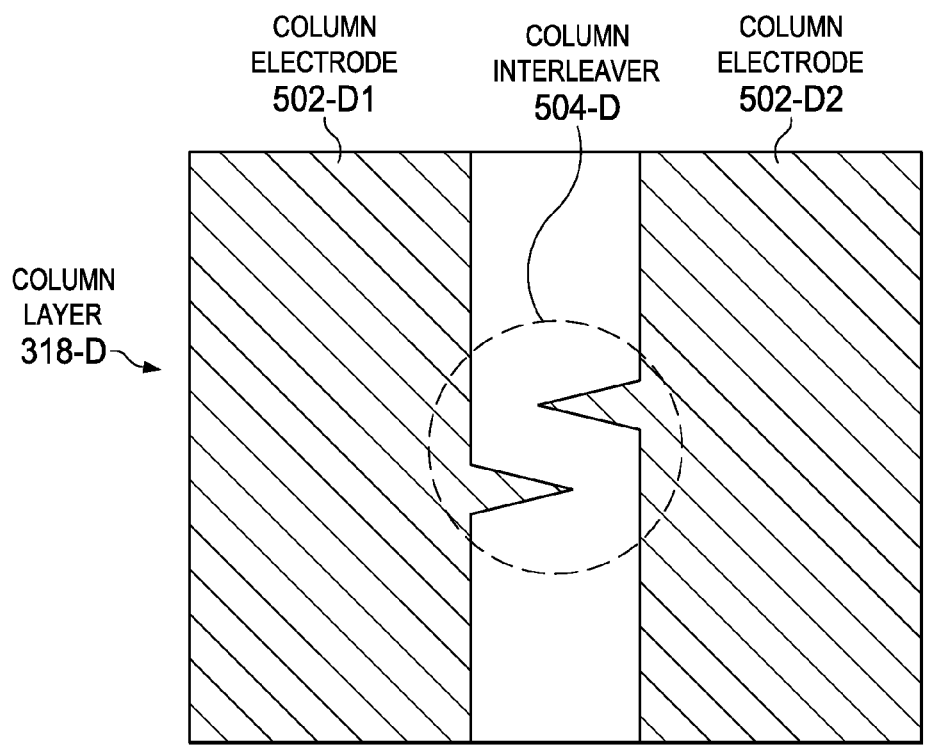

Additionally, as shown in FIGS. 15-17, the interleaving electrodes may take a variety of shapes. With section 206-B and 206-C (which are described above), the interleaving electrodes are substantially rectangular in shape, but it may be advantageous to employ other shapes. In the example shown in FIGS. 15-17, row interleaver 404-D and column interleaver 504-D employ triangular shaped interleaving electrodes.

Figure 18:
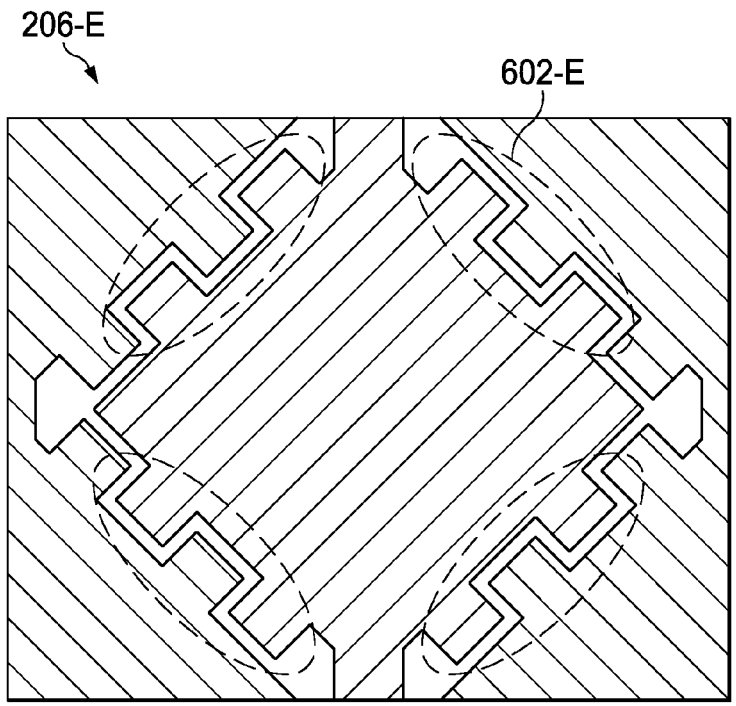
Figure 19:
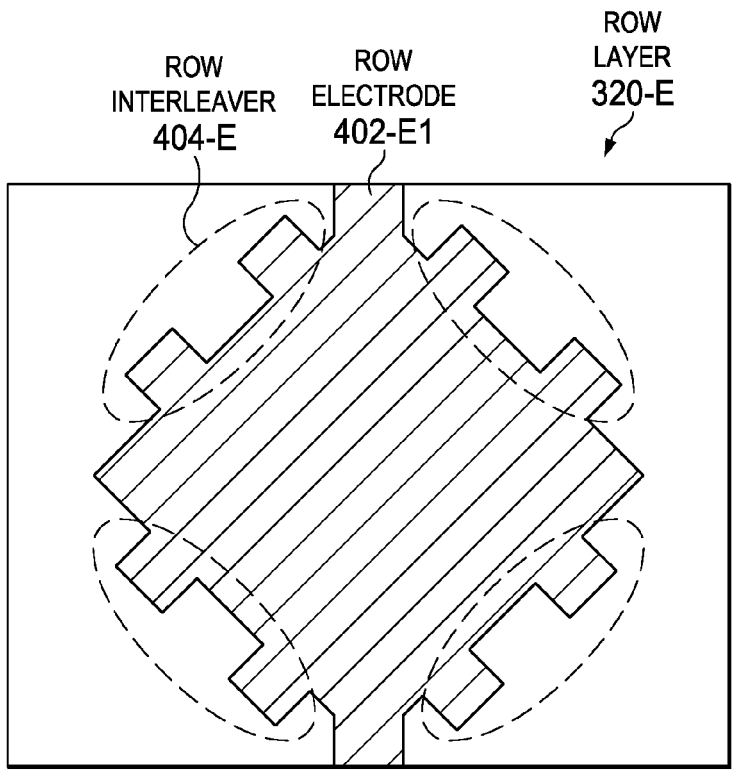
Figure 20:
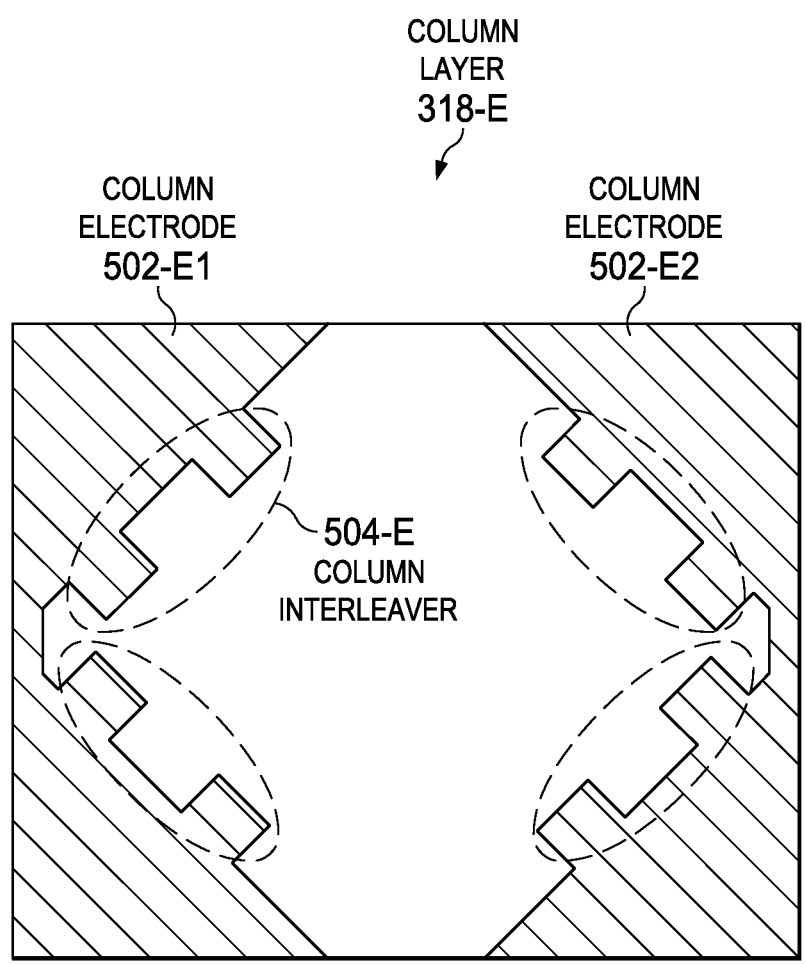

The interleaving electrodes may also be employed with various detection electrode shapes as well. In the example shown in FIGS. 18-20, the column electrodes 502-E1 and 502-E2 and row electrodes 402-E1 and 402-E2 are arranged as diamond strip electrodes (similar to the configuration shown with touch panel 102) that are oriented in different directions so as to be perpendicular to one another. In this example, the interleaving electrodes for the column interleaver 504-E and row interleaver 404-E are positioned on the edges of the diamonds in the column electrodes 502-E1 and 502-E2 and row electrodes 402-E1 and 402-E2. This allows the performance of a touch sensor 322 with good response characteristics (e.g., use of diamond strip electrodes) can be further improved.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a first layer having:
      a first set of detection electrodes that are spaced apart and electrically isolated from one another, each of the first set of detection electrodes substantially transparent to visible spectrum light; and
      a first set of interleavers, each of the first set of interleavers located between adjacent detection electrodes of the first set of detection electrodes, and each interleaver including:
         a first set of interleaving electrodes electrically coupled to a first detection electrode of the first set of detection electrodes, each interleaving electrode of the first set of interleaving electrodes protruded from and perpendicular to the first detection electrode, and each interleaving electrode of the first set of interleaving electrodes substantially transparent to visible spectrum light; and
         a second set of interleaving electrodes interleaving with the first set of interleaving electrodes, the second set of interleaving electrodes electrically coupled to a second detection electrode from the first set of detection electrodes, the second detection electrode spaced apart and electrically isolated from the first detection electrode, each interleaving electrode of the second set of interleaving electrodes protruded from and perpendicular to the second detection electrode, and each interleaving electrode of the first set of interleaving electrodes substantially transparent to visible spectrum light; and
   a second layer that is disposed over the first layer, the second layer having:
      a second set of detection electrodes spaced apart and electrically isolated from one another, each detection electrode of the second set of detection electrodes substantially transparent to visible spectrum light; and
      a second set of interleavers, each interleaver of the second set of interleavers located between adjacent detection electrodes of the second set of detection electrodes, and each interleaver of the second set of interleavers including:
         a third set of interleaving electrodes electrically coupled to a third detection electrode of the second set of detection electrodes, each interleaving electrode of the third set of interleaving electrodes substantially transparent to visible spectrum light; and
         a fourth set of interleaving electrodes electrically coupled to a fourth detection electrodes of the second set of detection electrodes, each interleaving electrode of the fourth set of interleaving electrodes substantially transparent to visible spectrum light.

2. The apparatus of claim 1, wherein the first layer further comprises:
a substrate that is substantially transparent to visible spectrum light;
a conductive layer disposed over the substrate, wherein the conductive layer is patterned to form the first sets of detection electrodes and interleavers; and
an insulating layer disposed over the conductive layer.

3. The apparatus of claim 2, wherein the conductive layer further comprises a first conductive layer, and wherein the insulating layer further comprises a first insulating layer, and wherein the second layer further comprises:
a second conductive layer disposed over the first layer, wherein the second conductive layer is patterned to form the second sets of detection electrodes and interleavers; and
a second insulating layer disposed over the conductive layer.

4. The apparatus of claim 3, wherein the first set of detection electrodes further comprises a first set of strip electrodes that are substantially parallel with one another and are oriented in a first direction, and wherein the second set of detection electrodes further comprises a second set of strip electrodes that are substantially parallel to one another and oriented in a second direction, and wherein the orientation of the first and second sets of strip electrodes with respect to one another forms a plurality of non-overlapping zones.

5. The apparatus of claim 4, wherein the first direction is substantially perpendicular to the second direction.

6. The apparatus of claim 5, wherein complementary pairs of interleaving electrodes from at least one of the first and second sets of interleaving electrodes and the third and fourth sets of interleaving electrodes are located in each non-overlapping zone.

7. The apparatus of claim 6, wherein each interleaving electrode is substantially rectangular in shape.

8. The apparatus of claim 6, wherein each interleaving electrode is substantially triangular in shape.

9. The apparatus of claim 6, wherein the first and second sets of strip electrodes further comprise first and second sets of linear strip electrodes.

10. The apparatus of claim 6, wherein the first and second sets of strip electrodes further comprise first and second sets of diamond strip electrodes.

11. The apparatus of claim 6, wherein the complementary pairs of interleaving electrodes from the first and second sets of interleaving electrodes and from the third and fourth sets of interleaving electrodes are located in each non-overlapping zone.

12. The apparatus of claim 3, wherein the first set of interleaving electrodes form a first set of first serpentines with its detection electrodes, and wherein the second set of interleaving electrodes form a second set of serpentines with its detection electrodes, and wherein each first serpentine is interleaved with at least one second serpentine.

13. The apparatus of claim 12, wherein the third and fourth interleaving electrodes form a zig-zag pattern that overlaps the interleaved first and second serpentines.

14. An apparatus comprising:
a touch panel screen having a touch sensor disposed over a display, wherein the touch sensor has:
a first layer having:
a first set of detection electrodes that are spaced apart and electrically isolated from one another, each of the first set of detection electrodes substantially transparent to visible spectrum light; and
a first set of interleavers, each of the first set of interleavers located between adjacent detection electrodes of the first set of detection electrodes, and each interleaver including:
a first set of interleaving electrodes electrically coupled to a first detection electrode of the first set of detection electrodes, each interleaving electrode of the first set of interleaving electrodes protruded from and perpendicular to the first detection electrode, and each interleaving electrode of the first set of interleaving electrodes substantially transparent to visible spectrum light; and
a second set of interleaving electrodes interleaving with the first set of interleaving electrodes, the second set of interleaving electrodes electrically coupled to a second detection electrode from the first set of detection electrodes, the second detection electrode spaced apart and electrically isolated from the first detection electrode, each interleaving electrode of the second set of interleaving electrodes protruded from and perpendicular to the second detection electrode, and each interleaving electrode of the first set of interleaving electrodes substantially transparent to visible spectrum light; and
a second layer that is disposed over the first layer, the second layer having:
a second set of detection electrodes spaced apart and electrically isolated from one another, each detection electrode of the second set of detection electrodes substantially transparent to visible spectrum light; and
a second set of interleavers, each interleaver of the second set of interleavers located between adjacent detection electrodes of the second set of detection electrodes, and each interleaver of the second set of interleavers including:
a third set of interleaving electrodes electrically coupled to a third detection electrode of the second set of detection electrodes, each interleaving electrode of the third set of interleaving electrodes substantially transparent to visible spectrum light; and
a fourth set of interleaving electrodes electrically coupled to a fourth detection electrodes of the second set of detection electrodes, each interleaving electrode of the fourth set of interleaving electrodes substantially transparent to visible spectrum light; and
a touch panel controller that is electrically coupled to the first and second sets of detection electrodes.

15. The apparatus of claim 14, wherein the first layer further comprises:
a substrate that is substantially transparent to visible spectrum light;
a conductive layer disposed over the substrate, wherein the conductive layer is patterned to form the first sets of detection electrodes and interleavers; and
an insulating layer disposed over the conductive layer.

16. The apparatus of claim 15, wherein the conductive layer further comprises a first conductive layer, and wherein the insulating layer further comprises a first insulating layer, and wherein the second layer further comprises:

a second conductive layer disposed over the first layer, wherein the second conductive layer is patterned to form the second sets of detection electrodes and interleavers; and a second insulating layer disposed over the conductive layer.

17. The apparatus of claim 16, wherein the first set of detection electrodes further comprises a first set of strip electrodes that are substantially parallel with one another and are oriented in a first direction, and wherein the second set of detection electrodes further comprises a second set of strip electrodes that are substantially parallel to one another and oriented in a second direction, and wherein the orientation of the first and second sets of strip electrodes with respect to one another forms a plurality of non-overlapping zones.

18. The apparatus of claim 17, wherein the first direction is substantially perpendicular to the second direction.

19. The apparatus of claim 18, wherein complementary pairs of interleaving electrodes from at least one of the first and second sets of interleaving electrodes and the third and fourth sets of interleaving electrodes are located in each non-overlapping zone.

20. The apparatus of claim 19, wherein each interleaving electrode is substantially rectangular in shape.

21. The apparatus of claim 19, wherein each interleaving electrode is substantially triangular in shape.

22. The apparatus of claim 19, wherein the first and second sets of strip electrodes further comprise first and second sets of linear strip electrodes.

23. The apparatus of claim 19, wherein the first and second sets of strip electrodes further comprise first and second sets of diamond strip electrodes.

24. The apparatus of claim 19, wherein the complementary pairs of interleaving electrodes from the first and second sets of interleaving electrodes and from the third and fourth sets of interleaving electrodes are located in each non-overlapping zone.

25. The apparatus of claim 16, wherein the first set of interleaving electrodes form a first set of first serpentines with its detection electrodes, and wherein the second set of interleaving electrodes form a second set of serpentines with its detection electrodes, and wherein each first serpentine is interleaved with at least one second serpentine.

26. The apparatus of claim 25, wherein the third and fourth interleaving electrodes form a zig-zag pattern that overlaps the interleaved first and second serpentines.

* * * * *